United States Patent [19]

Inaba

[11] Patent Number: 4,847,452

[45] Date of Patent: Jul. 11, 1989

[54] KEY SWITCH STRUCTURE FOR A THIN-GAGE ELECTRONIC DEVICE

[75] Inventor: Toyokazu Inaba, Tokyo, Japan

[73] Assignee: Oki Electric Industry Co., Ltd., Tokyo, Japan

[21] Appl. No.: 206,862

[22] Filed: Jun. 13, 1988

[30] Foreign Application Priority Data

Jun. 17, 1987 [JP] Japan .......................... 62-91978[U]

[51] Int. Cl.[4] ...................... H01H 13/70; H01H 1/10; G06F 3/02

[52] U.S. Cl. ..................................... 200/5 A; 200/512

[58] Field of Search ....... 200/5 A, 305, 406, 512–517, 200/341–345; 361/398, 212, 220

[56] References Cited

U.S. PATENT DOCUMENTS 4,220,815 9/1980 Gibson et al. ................ 200/86 R X
4,303,960 12/1981 Sherwood et al. ................ 361/212
4,336,529 6/1982 Buan ............................. 200/305 X
4,472,609 9/1984 Lamm et al. .................... 361/398 X
4,529,959 7/1985 Ito et al. ....................... 200/86 R X
4,620,075 10/1986 LaBelle et al. ................. 200/5 A X
4,628,408 12/1986 Kimura .......................... 361/398 X

FOREIGN PATENT DOCUMENTS 60-91695 5/1985 Japan .

*Primary Examiner*—J. R. Scott
*Attorney, Agent, or Firm*—Wenderoth, Lind & Ponack

[57] ABSTRACT

A key switch structure is provided which improves the reliability of the elasticity of the switch. A front film has a metal front panel adhered to its underside. A switch panel pattern is formed in the front panel and includes an operational member or contact unitary with the front panel, connected thereto by spring portions formed of connection members and leg members, connected to supports of the metal front panel. The contact has a carbon film on its underside, and is separated from a fixed contact by a spacer film. The spring portions eliminate the problem of deformation by creep of the front film and thus improve the reliability of the key switch.

8 Claims, 1 Drawing Sheet

KEY SWITCH STRUCTURE FOR A THIN-GAGE ELECTRONIC DEVICE

BACKGROUND OF THE INVENTION

The present invention relates to a key switch structure adapted to a thin-gage electronic device such as an IC card having a key input portion.

There is, for example, shown a conventional type key switch structure in the Japanese laid-open patent application 60-91695. FIG. 3 shows a partially sectional view of the conventional key switch structure. In the drawing, a film-like movable contact 5 which can touch a fixed contact 4 provided on an interconnection board 3 is disposed on the inner surface of the key portion 2 of a front film 1. The contact 5 comprises a double phased adhesive film 6 and a carbon film 7 adhered to the lower surface of the film 6. The upper surface of the film 6 is adhesively secured with an adhesive material 8 onto the front film 1.

The contact 5 is disposed between a key aperture 10 formed in a front panel 9 and a key aperture 12 formed in a spacer film 11.

The above disclosed structure, however, has a shortcoming in that the front film 1 becomes gradually deformed by creep due to repeated depression of the key portion 2, decreasing the gap between the carbon film 7 and the fixed contact 4. This causes a depression power difference between each of the keys, so that the keys become difficult to use because of a sense of incongruity between the keys.

In the worst case, the carbon film 7 approaches the fixed contact 4 so that the carbon film 7 touches the fixed contact 4 without a key-in operation.

SUMMARY OF THE INVENTION

The object of the present invention is, therefore, to provide an improved key switch structure for a thin-gage electronic device having good operability and reliability.

To accomplish the above object, there is provided a key switch structure comprising a front film and a front panel made of metal being attached on a lower surface of the front film, the front panel further constituting a resilient prescribed switch panel pattern therein.

DETAILED DESCRIPTION OF THE PREFERRED EMBODIMENT

Figure 1:
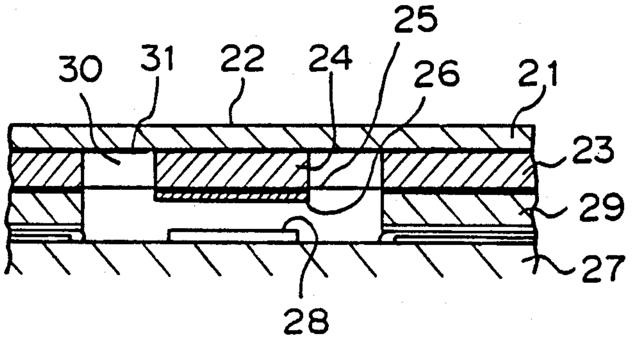
FIG. 1 shows a partially sectional view of an embodiment according to the present invention.

In FIG. 1, there is provided a switch panel pattern 24 unitary with a front panel 23 on the lower surface of a key portion 22 of a front film 21. The front panel 23 can be made, for example, of stainless steel 0.1 mm in thickness.

A substantially square area is defined by support members **24*d* in the switch panel pattern 24, where prescribed patterns are formed so as to act as a spring when an operational member 24*a*** is actuated.

The prescribed patterns comprise an operational member **24*a* located in a center, connection members 24*b* extending from both sides of the operational member 24*a*, and leg members 24*c* respectively connected to each of the edges of the connection members 24*b*.**

The switch panel patterns 24 and a carbon film 26 are adhered together with adhesive material 25, and comprise a movable contact.

In FIG. 1, numerals 29, 30 and 31 indicate a spacer film, a key aperture, and an adhesive material, respectively. Adhesive 31 coats the upper surface of the front panel 23 and switch panel pattern 24 to adhere them to the front film 21.

Figure 2:
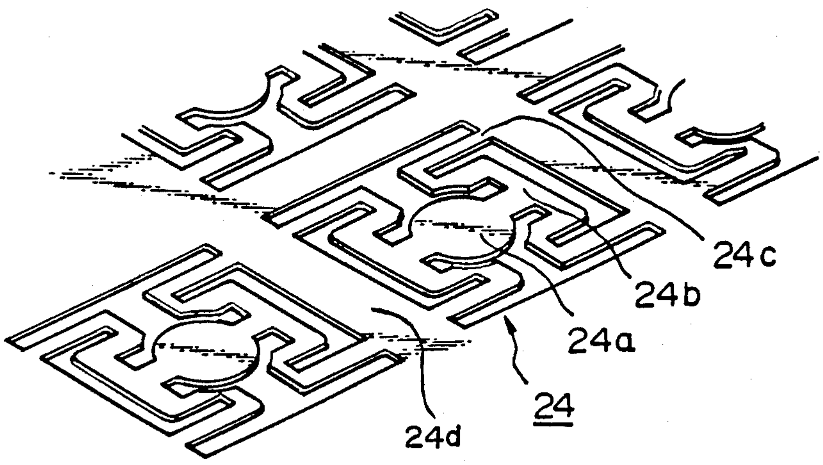
FIG. 2 shows a perspective view of a switch panel pattern of an embodiment according to the present invention.
Figure 3:
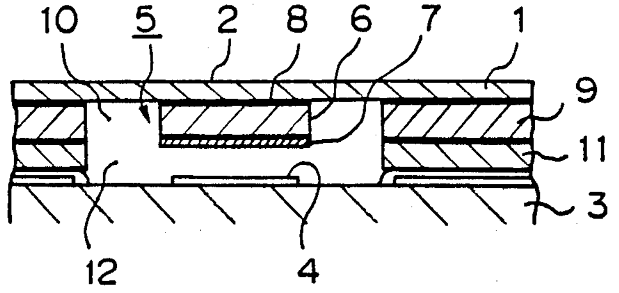
Fig. 3 PRIOR ART
FIG. 3 shows a partially sectional view of a conventional key switch structure.

The prescribed patterns 24 by which the spring function is given are formed as shown in FIG. 2 on the front panel 23 by etching, but it is also possible to make the patterns mechanically.

The elasticity of the prescribed patterns causes less fatigue in the front film 21, and brings about better and easier switch operation.

In this key switch structure, when a key is depressed a carbon film 26 adhered to the switch panel pattern 24 touches a fixed contact 28 of an interconnection board 27. When the key is released, the carbon film 26 is restored to its former position by the restoring force of the spring portion.

In the present invention, on the lower surface of a key portion, there is thus provided a spring portion constructed of the connection members **24*b* and the leg members 24*c* in the switch panel pattern 24, unitary with the front panel 23** and made of stainless steel. The key switch can be operated by using the restoring force (Spring Moment) of the spring portion. This results in a key switch structure for a thin-gage electronic device having good operability and reliability, and free from the conventional problem of film deformation by creep in the key portion.

Moreover, since the key switch has the switch panel pattern 24 unitary with the front panel 23, when the front panel is grounded, static electricity from the human body can be absorbed into the front panel. Therefore, internal destruction of a semiconductor device by human static electricity can be prevented.

What is claimed is:

1. A key switch structure for a thin-gage electronic device, comprising:
   - a front film;
   - a metal front panel attached to said front film;
   - a substrate having at least one fixed contact thereon;
   - a spacer film disposed between said metal front panel and said substrate to space said metal front panel from said fixed contact;
   - at least one movable contact portion unitary and one-piece with said metal front panel, said movable contact portion comprising a movable contact member and spring means for unitarily connecting said movable contact member to said metal front panel and resiliently resisting movement of said movable contact member toward said substrate and said fixed contact, wherein depression of said front film at said movable contact portion of said metal front panel causes said movable contact member to contact said fixed contact on said substrate, and release of depression of said front film at said movable contact portion causes said spring means to move said movable contact member out of contact with said fixed contact.

2. The key switch structure as set forth in claim 1, wherein:

said substrate comprises an interconnection board.

3. The key switch structure as set forth in claim 1, wherein:

said movable contact member has a carbon film adhered thereto.

4. The key switch structure as set forth in claim 1, wherein:

an adhesive material attaches said front film to said metal front panel.

5. The key switch structure as set forth in claim 1, wherein:

said metal front panel includes a plurality of support members adjacent to said movable contact portion; and said spacer film is attached to said metal front panel at said support members only, to thereby form an aperture in said spacer film at said movable contact portion.

6. The key switch structure as set forth in claim 1, wherein:

said spring means comprises a pair of springs.

7. The key switch structure as set forth in claim 1, wherein:

said metal front panel includes a plurality of support members adjacent to said movable contact portion; and each said spring comprises a connection member unitary with and extending from said movable contact member and a pair of legs, each said leg unitary with and extending from said connection member to a said support member of said metal front panel.

8. The key switch structure as set forth in claim 1, wherein:

said spring means comprises a plurality of spring members connecting said movable contact member to said metal front panel.

* * * * *